(12) United States Patent
Watson

(10) Patent No.: US 7,783,130 B2
(45) Date of Patent: Aug. 24, 2010

(54) SPATIAL STANDARD OBSERVER

(75) Inventor: Andrew B. Watson, Los Gatos, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1157 days.

(21) Appl. No.: 11/045,041

(22) Filed: Jan. 24, 2005

(65) Prior Publication Data

US 2006/0165311 A1 Jul. 27, 2006

(51) Int. Cl.
*G06K 9/36* (2006.01)
*G06K 9/00* (2006.01)
(52) U.S. Cl. ...................... 382/286; 382/130
(58) Field of Classification Search ................ 382/106, 382/263, 286, 279, 130
See application file for complete search history.

(56) References Cited

U.S. PATENT DOCUMENTS

| | | | |
|---|---|---|---|
| 5,694,491 A | 12/1997 | Brill et al. | |
| 5,719,966 A | 2/1998 | Brill et al. | |
| 5,974,159 A * | 10/1999 | Lubin et al. | 382/106 |
| 6,148,117 A * | 11/2000 | Lopez et al. | 382/279 |
| 6,799,515 B2 * | 10/2004 | Lynn et al. | 101/483 |
| 6,977,664 B1 | 12/2005 | Jinzenji et al. | |
| 2002/0031277 A1 * | 3/2002 | Lubin et al. | 382/254 |
| 2002/0145757 A1 | 10/2002 | Fedorovskaya et al. | |

FOREIGN PATENT DOCUMENTS

| | | |
|---|---|---|
| WO | WO 02/06851 | 1/2002 |
| WO | WO 2004/086751 | 10/2004 |

OTHER PUBLICATIONS

Ahumada, Jr., "Computational Image Quality Metrics: A Review", Society for Information Display International Symposium Digest of Technical Papers 24, pp. 305-308 (1993).

(Continued)

*Primary Examiner*—Vu Le
*Assistant Examiner*—Amara Abdi
(74) *Attorney, Agent, or Firm*—John F. Schipper; Robert M. Padilla

(57) ABSTRACT

The present invention relates to devices and methods for the measurement and/or for the specification of the perceptual intensity of a visual image, or the perceptual distance between a pair of images. Grayscale test and reference images are processed to produce test and reference luminance images. A luminance filter function is convolved with the reference luminance image to produce a local mean luminance reference image. Test and reference contrast images are produced from the local mean luminance reference image and the test and reference luminance images respectively, followed by application of a contrast sensitivity filter. The resulting images are combined according to mathematical prescriptions to produce a Just Noticeable Difference, JND value, indicative of a Spatial Standard Observer, SSO. Some embodiments include masking functions, window functions, special treatment for images lying on or near borders and pre-processing of test images.

7 Claims, 4 Drawing Sheets

OTHER PUBLICATIONS

Barten, "The SQRI Method: A New Method for the Evaluation of Visible Resolution on a Display", Proceedings of the SID, 1987, vol. 28/3, pp. 253-262.

Chen et al, "Detection of Chromoluminance Patterns on Chromoluminance Pedestals I: Threshold Measurements", Vision Research 40, 2000, pp. 773-778.

Chen et al, "Detection of Chromoluminance Patterns on Chromoluminance Pedestals II: Model", Vision Research 40, 2000, pp. 789-803.

Lubin, "A Human Vision System Model for Objective Picture Quality Measurements", International Broadcasting Convention, Sep. 12 16, 1997, Conference Publication No. 447, pp. 498-503.

Rohaly et al, "A Comparison of Image Quality Models and Metrics Predicting Object Detection," Society for Information Display International Symposium Digest of Technical Papers 26, pp. 45-48 (1995).

Watson et al, "Video Quality Measures Based on the Standard Spatial Observer", 2002 IEEE International Conference on Image Processing, WA-L2.2, Sep. 25, 2002.

Watson, "Visual Detection of Spatial Contrast Patterns: Evaluation of Five Simple Models", Optics Express, Jan. 3, 2000, vol. 6, No. 1, pp. 12-33.

Watson et al, "A Standard Observer for Spatial Vision", Investigative Ophthalmology and Visual Science vol. 41., No. 4, p. S713 (2000).

* cited by examiner

SPATIAL STANDARD OBSERVER

The invention described herein was made by employees of the United States Government and may be manufactured and used by or for the Government for governmental purposes without payment of any royalties thereon or therefor.

BACKGROUND OF INVENTION

1. Technical Field of the Invention

This invention relates generally to the field of devices and methods for the specification and measurement of the perceptual intensity of one or more visual images and, more particularly, to the rapid and efficient determination of a visibility metric for such images.

2. Description of the Prior Art

Vision is the means by which most people acquire and process information about the world around them. Numerous objects intended for human use include a component of information to be identified visually by a human observer. Some everyday examples include information displayed on a screen or page, keys or buttons to be pressed on a keyboard, telephone, calculator, remote control unit, among many other examples. Therefore, it is reasonable that the design of such objects include specifications to insure that the visual information is accessible to typical human observers, that is, that the information is visible. Providing a means for measuring and specifying visibility, a "visibility metric," is an objective of the present invention.

A significant challenge in designing standards for visibility is that such standards are based upon models of the human visual sense. However, vision is a complex and only partially understood process. Previous standards for visibility have thus tended to be complex, difficult to use and not sufficiently general to serve as a standard method or methods for the specification and measurement of visibility. The performance of various visibility metrics has been reviewed by Ahumada and coworkers in two publications: *Society for Information Display, International Symposium, Digest of Technical Papers* Vol. 24, pp. 305-308 (1993) and Vol. 26. pp. 45-48 (1995), the contents of both publications are incorporated herein by reference.

Other examples of visibility metrics include the work of Lubin and co-workers U.S. Pat. No. 6,654,504, US Patent Application Publication 2002/0031277 and "A Human System Model for Objective Picture Quality Measurements," *Proceedings, International Broadcasters'Convention*, Amsterdam, The Netherlands, pp. 498-503 (1997). These methods developed by Lubin and co-workers require extensive calibration for each application in addition to suffering from the disadvantage of complexity. These methods are chiefly intended for image quality evaluation.

Other methods for estimating visibility include those of Barten, "The SQRI Method: A New Method for the Evaluation of Visible Resolution on a Display," *Proceedings of the Society for Information Display*, Vol. 28, pp. 253-262 (1987). In addition to complexity, the Barten method suffers from the further disadvantage of being appropriate primarily for the specification of displays such as television monitors.

Standards for the measurement and specification of color are known in the art and widely used. However, such color standards typically do not address the spatial pattern employed in a visual signal (for example, the shape of a letter). Consequently, such methods are not appropriate for specifying or measuring visibility.

Thus, a need exists in the art for a standard specification and measurement of visibility, sufficiently general to be applicable to large classes of visual information but sufficiently simple for widespread implementation and use, including embedding into inexpensive systems.

SUMMARY OF THE INVENTION

Accordingly and advantageously, the present invention relates to systems and techniques for processing visual information to produce a single numerical value for the visibility metric indicative of a Spatial Standard Observer (SSO). Advantages of the SSO include a simple and efficient design that produces an accurate visibility metric with a relatively few calculations.

Some embodiments of the present invention use a Minkowski sum directly over filtered image pixels. This technique avoids the need for complicated spatial frequency filter banks, with a corresponding gain in simplicity and computational efficiency.

A particular form of Contrast Sensitivity Filter (CSF) is used in some embodiments of the present invention which combines radial- and oblique-effect filters. This permits accurate visibility predictions of the visibility of oblique patterns such as half-toning and rasterizing artifacts.

Viewing distance and image resolution are jointly treated in an advantageous manner in some embodiments of the present invention. The use of this feature causes the computed value of image visibility to be substantially independent of image resolution (except to the extent that the resolution actually alters the visibility of the information in the image).

A window function is advantageously employed in some embodiments of the present invention in such a manner as to represent the reduction in visibility with distance from the observer's region of fixation.

It is advantageous in some embodiments of the present invention to use convolution operations along with the window function. In this manner it is feasible to simulate the scanning of an image by the eye of the observer.

Pooling the data accumulates the visibility over the scan and is advantageously employed in some embodiments of the present invention.

When images are located near a border region, it may occur that the border has a markedly different intensity (typically darker) than that of the image and the general image background. In such cases, it is advantageous in some embodiments of the present invention to introduce special procedures for handling border effects. Two examples are presented. One includes at least a portion of the border into the definition of "image" leading to a enhanced image that is then processed by the SSO. Another approach is to attenuate the image contrast near the border.

The SSO provides a standardized measure of visibility, allowing comparisons to be made of visibility measurements taken in a wide variety of applications, locations and times. Manufacturing and engineering specifications of visibility in standardized units can then be made.

Furthermore, SSO visibility measurements are not limited by target size. Thus, very large or very small displays can use SSO.

The SSO further provides the feasibility of making simple, automated measurements of the visibility of visual information, not requiring the use of human observers to estimate visibility. Simplicity of measurement is an important feature of SSO in order to allow SSO to be adopted in a wide variety of applications and at low cost.

SSO has numerous potential areas of application. We note a few applications as illustrative of the utility of SSO, not thereby limiting the scope of SSO to only those enumerated.

Many other applications are apparent to those with ordinary skill in the art, within the scope of the present invention. Possible applications include:

Photometric Instruments incorporating SSO to produce a "spatial photometer" for the measurement of the visibility of spatial patterns.

Imaging Devices and Systems employing SSO to calculate the visibility of targets as viewed through those systems such as infrared viewing systems and remote viewing systems (e.g., as in unmanned aerial vehicles).

Copier Manufacturing employing SSO to measure the visibility of defects produced by copiers and thus test the copier and/or improve copier design.

Video Codecs employing SSO in testing and/or design to measure the visibility of image compression artifacts with a view towards reducing visible defects and increasing bitrate.

Display Manufacturing employing SSO to detect and measure visible artifacts with a view towards improving and automating product quality control and output by only rejecting devices having visible artifacts.

Graphics Software employing SSO to estimate the visibility of graphic elements and/or to estimate the visibility of artifacts due to the rendering process.

Predicting Visual Performance of Humans Following Vision Correction using SSO and thereby pre-evaluate the relative efficacy of various correction procedures before surgery.

Digital Watermarking employing SSO to calculate the visibility of a recoverable signature labeling an image that is intended to be invisible to a human viewer.

These are among the advantages achieved in accordance with various embodiments of the present invention as described in detail below.

BRIEF DESCRIPTION OF THE DRAWINGS

To facilitate understanding, identical reference numerals have been used, where possible, to designate identical elements that are common to the figures.

The techniques of the present invention can readily be understood by considering the following detailed description in conjunction with the following drawings, in which.

DETAILED DESCRIPTION OF THE INVENTION

Figure 1:
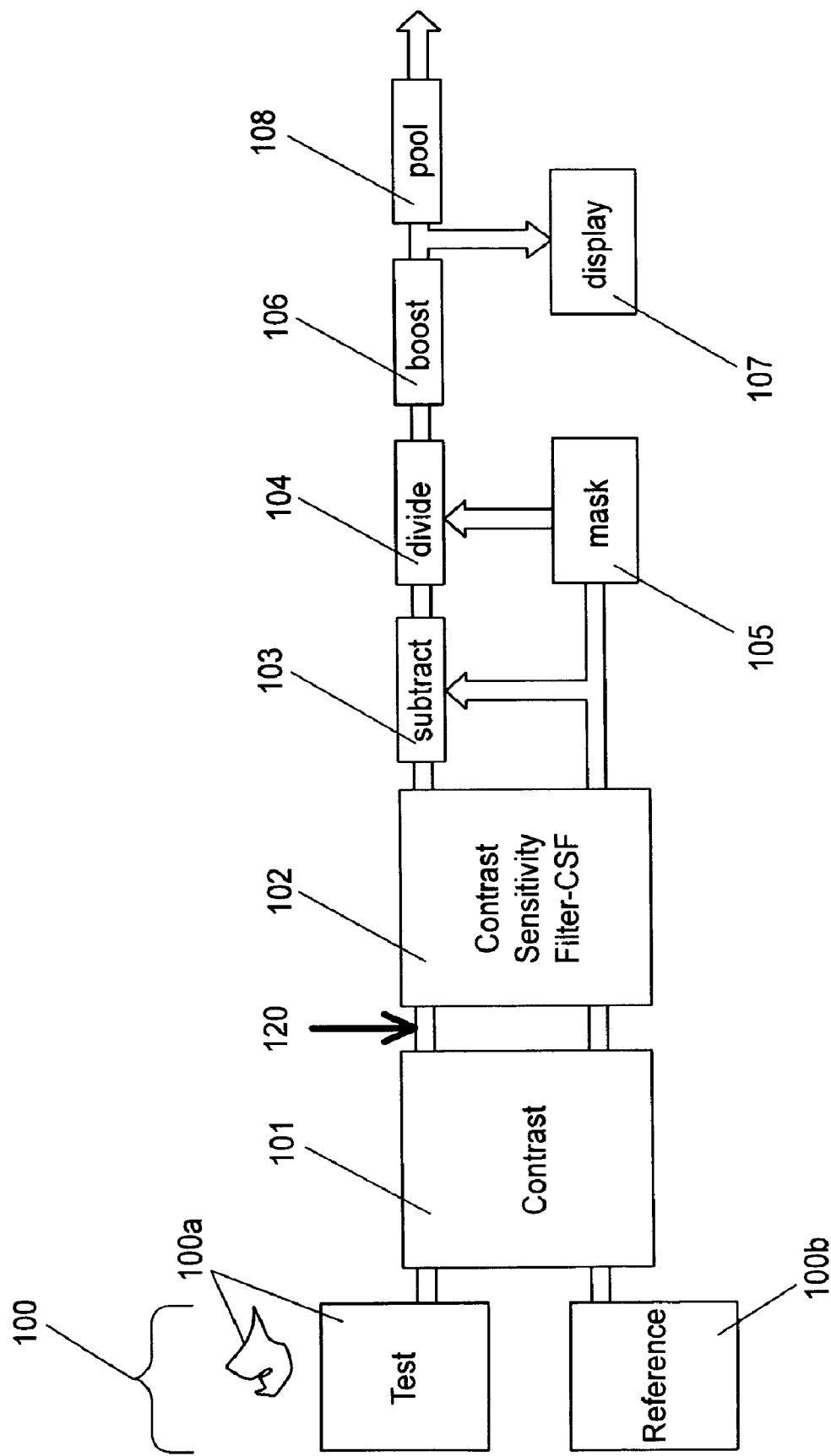
FIG. 1 depicts a high-level block diagram of a typical embodiment of a Spatial Standard Observer used to compute a visibility metric.

After considering the following description, those skilled in the art will clearly realize that the teachings of the invention can be readily utilized for determining the probable visibility of various graphical or visual depictions and displays as viewed by a typical human observer. In particular, the present invention relates generally to systems and techniques for processing one or more images to produce a single numerical value, or "visibility metric," indicative of a "Spatial Standard Observer" (SSO). Advantages of the present invention include techniques for the rapid evaluation of the SSO.

The present invention relates generally to devices and methods for the measurement and/or for the specification of the perceptual intensity of a visual image. Other embodiments relate generally to devices and methods for the measurement and/or for the specification of differences in perception or "perceptual distance" between two or more visual images. Such devices and methods can be advantageously used in situations in which it is desired to measure or to specify visibility or visual intensity. Examples include the determination of visibility and/or discriminability of text, graphic elements, labels, icons, among other visual images. Examples also include the determination of visibility and/or discriminability between images, such as an original image and a compressed digital form of that image. Some embodiments of the present invention can also be advantageously used to quantify the visibility of blemishes on a display as might be useful, for example, in providing objective determinations of pass/fail criteria in the manufacture of displays.

In essence, various embodiments of the present invention operate on a digital image (or an analog image following digitization) or on a pair of digital images. An arbitrary number of images can be compared by repeated pairwise comparisons. Thus, for economy of language we will describe applications of the present invention to a single digital image or to the comparison of two digital images, understanding that this is by way of illustration and not limitation since multiple images can be handled by multiple applications of such pairwise comparisons. Analogue images can be handled within the scope of the present invention following digitization by any of numerous digitization techniques well-known in the art, such as use of a digital camera, a scanner, among other devices and digitization techniques known in the field.

In the comparison of two digital images, it is advantageous in some embodiments of the present invention to pre-process the images to erase any inessential difference before presenting them as input to the SSO. Such pre-processing removal of inessential differences can improve the speed to SSO processing, further enhancing the range of potential applications amenable to SSO processing.

Also, by way of illustration and not limitation, it will be presumed in our descriptions that the images are viewed on a particular display called the reference display, and viewed at a particular viewing distance. Techniques are well-known in the art for translating an image on a non-reference display into a digital representation as it would appear on the reference display, and for translating from an arbitrary viewing distance and angle to a standard viewing distance and angle.

Typical inputs in the construction of a Spatial Standard Observer (SSO) are two digital images having (or scaled so as to have) the same size, called herein a test image and a reference image. $G(x,y)$ is defined to be the grayscale of the pixel at column x and row y; $G_{test}(x,y)$, $G_{reference}(x,y)$ for the test and reference images respectively. We take the dimension of the image to be $n_x$ pixels in the x direction (width) and $n_y$ pixels in the y direction (height). Typical values are $n_x=640$ and $n_y=480$.

Letting $s_x$ and $s_y$ be the viewing angles subtended by the image in the x and y directions respectively, the viewing angles $s_x$, $s_y$ can be derived from the viewing distance and the image size in the plane of the display by the use of Eq. 1 twice, once to compute $s_x$ and once to compute $s_y$.

$$\tan\{(\Pi * \text{size(degrees)})/360\} = \frac{(0.5 * \text{size(cm)})}{\text{viewing distance (cm)}} \quad \text{Eq. 1a}$$

$$\text{size(degrees)} = \frac{360}{2\pi} \frac{\text{size(cm)}}{\text{viewing distance (cm)}} \quad \text{Eq. 1b}$$

Eq. 1b follows from Eq. 1a only when the ratio (size/(viewing distance)) is much less than one. But this is true in virtually all cases of practical interest so we use Eq. 1b hereinafter. Also, the designation of cm in Eq. 1a and 1b is for convenience, since it is only necessary that "size" and "viewing distance" be expressed in the same units of length.

The width and height of each pixel, $p_x$ and $p_y$ respectively, are given by Eq. 2 with $p_x$, $p_y$ in degrees if $s_x$ and $s_y$ are in degrees. Typical values are $s_x$=8 deg. and $s_y$=6 deg. yielding typical values for $p_x$=$p_y$=(1/80) deg.

$$p_x = \frac{s_x}{n_x}, \quad p_y = \frac{s_y}{n_y} \quad \text{Eq. 2}$$

The test and reference images, $G_{test}(x,y)$ and $G_{reference}(x,y)$ respectively, may contain noise, or may differ in those image components having high spatial frequencies whose visibilities are not of interest for the particular image analysis under consideration. In addition, the images may be captured at a higher resolution or larger area than is necessary for the particular image analysis. For these and other reasons, it may be useful to pre-process the test and reference images to remove noise, remove high frequency components and other components not significantly affecting the visibility analysis, to reduce image resolution, and/or to crop the image to a rectangle of interest (or other convenient shape). Such operations can be performed by filtering, downsampling and cropping, pursuant to some embodiments of the present invention. Such operations are optional and, when employed, can be employed in any combination, sequence or number. That is, multiple steps of each operation can be performed whenever advantageous to do so, and the sequence of various operations or combinations can also be adjusted for the particular image processing task at hand. To be concrete in our description, we describe typical pre-processing operations, individually and in a particular sequence, understanding thereby that the present invention is not limited to the particular steps, sequence, number or type of operations described.

It is convenient in some embodiments to pre-filter the test and reference images by convolution with a pre-filter function $PF(x,y)$ pursuant to Eq. 2.1

$$G'(x,y) = PF(x,y) \otimes G(x,y) \quad \text{Eq. 2.1}$$

for $G_{test}(x,y)$ and $G_{reference}(x,y)$ respectively. The G' function of Eq. 2.1, the pre-processed image, is then used in place of G in subsequent image processing, including in Eqs. 3, 4 and following.

In some embodiments of the present invention, it is convenient to use a pre-filter function $PF(x,y)$ given by Eq. 2.2.

$$PF(x,y) = PF(r) \quad \text{Eq. 2.2}$$

$$= \frac{1}{pscale^2} \exp\left(-\pi\left(\frac{r}{pscale}\right)^2\right)$$

$$r = \sqrt{(xp_x)^2 + (yp_y)^2}$$

in which pscale is a parameter, conveniently taken to be 0.125 degree in some embodiments.

The test and reference images can be downsampled by integer factors in the x and y directions $\{d_x, d_y\}$ respectively, by selecting every $d_x$-th column and $d_y$-th row from the original image to create a new, downsampled image $G''(x,y)$. This operation is conveniently expressed in terms of a "downsampling operator" DS as $$G''(x,y) = DS(G'(x,y), d_x, d_y) \quad \text{Eq. 2.3}$$

The new dimensions of the test and reference images in the x and y directions are thus given as $n_x'$ and $n_y'$ as in Eq. 2.4.

$$n_x' = \text{Floor}\left(\frac{n_x}{d_x}\right) \quad \text{Eq. 2.4}$$

$$n_y' = \text{Floor}\left(\frac{n_y}{d_y}\right)$$

in which the function "Floor[ ]" returns the nearest integer less than or equal to its argument. Typical values for $d_x$ and $d_y$ are $d_x=d_y=4$.

Eq. 2.3 uses the pre-processed image G' from Eq. 2.1 as the image from which the downsampled image G'' is derived. This is a particular example presented to be concrete in our description and not intending to limit the scope of the present invention. Although downsampling is almost always preceded by filtering to avoid aliasing, downsampling can be performed on an image with or without pre-filtering.

The image G, G' or G'' can be cropped to a rectangle of interest ROI. For definiteness, we describe cropping the G'' image having dimensions $n_x'$ and $n_y'$. It is convenient to describe the ROI by the pixel coordinates of its lower left corner $\{x_{LL}, y_{LL}\}$ and upper right corner $\{x_{UR}, y_{UR}\}$ respectively. Cropping is conveniently performed by deleting from the image rows 1 through $(y_{LL}-1)$ inclusive, and rows $(y_{UR}+1)$ through $n_y'$ inclusive, as well as columns 1 through $(x_{LL}-1)$ inclusive, and columns $(x_{UR}+1)$ through $n_x'$ inclusive. The dimensions of the new, cropped image are thus $$n_x'' = x_{UR} - x_{LL} + 1$$

$$n_y'' = y_{UR} - y_{LL} + 1 \quad \text{Eq. 2.5}$$

If the pre-processing techniques are used, singly or in combination, the resulting output images (test and reference) are considered the input images to the other image processing procedures described herein. New image dimensions (if present) should also be used.

If a reference image is not readily available, it is convenient in some embodiments of the present invention to create one by deleting the target or structural component from a copy of the test image. If the target is confined to a local region on an otherwise uniform image with graylevel $G_0$, then it is convenient in some embodiments of the present invention to create a reference image as a uniform image having the same size as the test image with a graylevel also equal to $G_0$. Typical images are depicted as 100 in FIG. 1 with test image 100a and reference image 100b. The structural component of the test image 100a is shown adjacent to the image field merely for clarity of depiction, understanding that the images are actually superimposed.

If a reference image is not available, some embodiments of the present invention obtain a reference image by processing the test image, for example, convolving the test image with a reference filter, RF(x,y). It is advantageous in some embodiments to pre-process the test image pursuant to one or more of the pre-processing techniques described herein (or others known in the field) before application of the reference filter, that is, convolve RF with G, G', G" or equivalents, among others.

In some embodiments, it is convenient to create a reference image by smoothing the test image and thereby suppress from the test image the signals whose visibility is of interest. For example, smoothing can conveniently be carried out with a Gaussian reference filter having the form given by Eq. 2.6.

$$RF(x, y) = RF(r)$$
$$= \frac{1}{rscale^2} \text{Exp}\left(-\pi\left(\frac{r}{rscale}\right)^2\right)$$
$$r = \sqrt{(xp_x)^2 + (yp_y)^2}$$
Eq. 2.6

"rscale" is a parameter conveniently chosen to be 2 degree.

The reference image is then created by convolving the test image with the reference filter, Eq. 2.6, either by employing conventional convolution (e.g., Eq. 5a, 5b, 5c) or, advantageously according to some embodiments of the present invention, using "confined convolution," denoted by a "confined convolution operator" $\otimes_C$, as applied in Eq. 2.7.

$$G'''(x,y) = RF(x,y) \otimes_C G''(x,y)$$
Eq. 2.7

Eq. 2.7 depicts the example in which the pre-processed image G"" is convolved by confined convolution to produce a reference image G''', understanding that pre-processing the test image is optional and conventional or other forms of convolution can be employed.

Confined convolution offers some advantages in image processing. In standard cyclic convolution, the edges of the image are considered to be connected. Thus, image content close to one edge of the image may be spread over to the opposite edge, which is sometimes called the "wrap-around problem." Confined convolution is a form of convolution which avoids the wrap-around problem by, in effect, disconnecting the opposing edges of the image.

Confined convolution makes use of a "Pad-Convolve-Crop" (PCC) operator. The operands of the PCC operator are a general image function, I(x,y), and a kernel K(x,y) in which the kernel has $k_x$ columns and $k_y$ rows. The image I(x,y) is augmented or "padded" with rows and columns containing entries having a value of 0, such that the padded image has $k_x$ additional columns (of all 0's) and $k_y$ additional rows (of all 0's) in comparison with I(x,y). This padded I(x,y) is convolved with the kernel K(x,y). The image resulting from this convolution is then restored to the original image size by removing the added $k_y$ rows and $k_x$ columns. This sequence of operations defines the PCC operator operating on K and I, denoted as PCC(K(x,y),I(x,y)).

The confined convolution of K(x,y) with I(x,y) is then given by Eq. 2.8.

$$K(x, y) \otimes_C I(x, y) = \frac{PCC(K(x, y), I(x, y))}{PCC\left(\frac{K(x, y)}{\sum_y \sum_x K(x, y)}, 1(x, y)\right)}$$
Eq. 2.8 in which $1(x,y)$ is an image (array) all of whose entries=1 and which has the same number of rows and columns as the (unpadded) image I(x,y).

The reference and test images (optionally, following pre-processing) are converted from a grayscale format to local luminance contrast image. This conversion is depicted schematically as "Contrast" 101 in FIG. 1. The first step in this conversion or image transformation is the computation of a luminance image L(x,y) from the grayscales of each image, test and reference, denoted generally as G(x,y) to indicate either $G_{test}(x,y)$ or $G_{reference}(x,y)$ respectively. For economy of language we frequently omit subscripts "test" and "reference" using a single unsubscripted letter to indicate two equations or two variables, one each for "test" and "reference."

This transformation from grayscale G(x,y) to a luminance image or luminance L(x,y) is advantageously performed by a gamma function "Gamma" as in Eq. 3.

$$L(x,y) = \text{Gamma}[G(x,y)]$$
Eq. 3

The particular form and parameters used for the Gamma function will depend on the particular characteristics of the device displaying the test and reference images. A typical version is Eq. 4 in which the luminance L(x,y) is given by:

$$L(x,y) = L_{max}(G(x,y)/G_{max})^\gamma$$
Eq. 4 in which $L_{max}$ is the maximum possible luminance in the image, $G_{max}$ is the corresponding maximum grayscale value. $\gamma$ is the gamma exponent of the display, approximately correcting for nonlinearities in the luminance characteristics of the display. A typical value for $\gamma$ is $\gamma=2.2$. Eq.s 3 and 4 are applied to both test and reference images.

A local luminance filter is employed having a luminance filter function LF(x,y). It is then convenient to introduce a local mean luminance reference image LL(x,y) obtained by the convolution of the reference luminance image $L_{reference}(x,y)$ with the luminance filter function by Eq. 5a $$LL(x,y) = LF(x,y) \otimes L_{reference}(x,y)$$
Eq. 5a in which $\otimes$ denotes convolution of the two functions defined in known texts in the field, for example "Fourier Analysis and Imaging" by Roger N. Bracewell, (Kluwer Academic/Plenum Publishers, 2003), pp. 174-179, incorporated herein by reference. The convolution can be expressed in discrete and continuous forms as in Eq. 5b and 5c respectively.

$$LF(x,y) \otimes L_{reference}(x,y) =$$
$$\iint LF(x-\tau, y-\omega) L_{reference}(x,y) d\tau d\omega$$
Eq. 5b where the integrals extend over the domain in which LF($\tau,\omega$) is not zero. In discrete form the convolution is given by Eq. 5c.

$$LF(x, y) \otimes L_{reference}(x, y) =$$
$$\sum_{k=0}^{n_y-1} \sum_{j=0}^{n_x-1} LF(\text{Mod}(x-j, n_x), \text{Mod}(y-k, n_y)) L_{reference}(j, k)$$
Eq. 5c where Mod($a$, $b$) is the remainder when $a$ is divided by $b$.

In some embodiments of the present invention, it is convenient to use the luminance filter function LF(x,y) given by Eq. 6.

$$LF(x, y) = LF(r)$$
$$= \frac{1}{lscale^2} \text{Exp}\left(-\pi\left(\frac{r}{lscale}\right)^2\right)$$
$$r = \sqrt{(xp_x)^2 + (yp_y)^2}$$

Eq. 6 in which lscale is a parameter to be chosen. If lscale→+∞, this corresponds to an LL that is constant and equal to the average luminance over the image.

The average (MEAN) luminance, $L_{mean}$ is given by a numerical average of the luminance over all pixels in the x and y directions, Eq. 7.

$$L_{mean} = \frac{1}{n_x n_y} \sum_{y}^{n_y} \sum_{x}^{n_x} L_{reference}(x, y)$$

Eq. 7

A typical value for $L_{mean}$ is 40 candelas per sq. meter (40 cd/m²).

The contrast or contrast image of each pixel, C(x,y) is then given by Eq. 8 applied to both test and reference luminance images $L_{test}(x,y)$ and $L_{reference}(x,y)$ respectively.

$$C(x, y) = \frac{L(x, y)}{LL(x, y)} - 1$$

Eq. 8

For the particular embodiments described thus far, $L_{max}$ plays no apparent role since it appears as a multiplicative factor in both L (Eq. 4), and LL (through $L_{reference}$ (Eq.s 4 and 5)) hence canceling from Eq. 8. (Under the typically reasonable presumption that both test and reference images have the same maximum possible luminances, $L_{max}$.) However, it is convenient to retain $L_{max}$ in the equations since it simplifies the application of the equations in other embodiments of the present invention in which $L_{max}$ and/or $L_{mean}$ may play a role in determining parameters of the process. A typical value for $L_{max}$ is 100 cd/m².

Following the construction of test and reference contrast functions via Eq. 8, both test and reference images are typically passed through a Contrast Sensitivity Filter (CSF), 102 in FIG. 1. While various embodiments of CSF are feasible and can be used in connection with the present invention, it is advantageous in connection with some embodiments of the present invention to work in the frequency domain following application of a Discrete Fourier Transform, DFT, and its inverse DFT⁻¹. In such cases, the filtering can be described by Eq. 9 as $$F(x,y) = DFT^{-1}[CSF(u,v) * DFT[C(x,y)]]$$

Eq. 9 in which C(x,y) is the contrast function of the image from Eq. 8 and F(x,y) is the filtered image.

The Discrete Fourier Transform and the Inverse Discrete Fourier Transform, DFT[] and DFT⁻¹[], are conventional operations in the field of digital signal processing and described in many texts, for example, the text by Bracewell, supra at pp. 167-168, incorporated herein by reference.

CSF(u,v) is the discrete version of a Contrast Sensitivity Filter in the frequency domain, and u and v are horizontal and vertical frequency indices respectively in units of cycles/width and cycles/height.

The discrete, frequency domain version of the Contrast Sensitivity filter, CSF(u,v) is conveniently given by the product of a radial contrast sensitivity function, RCSF(u,v), and an oblique effect contrast sensitivity filter, OEF(u,v), as expressed in Eq. 10.

$$CSF(u,v) = RCSF(u,v)OEF(u,v)$$

Eq. 10

In some embodiments of the present invention it is convenient to choose a radial function RCSF having the form given in Eq. 11.

$$RCSF(u, v) = RCSF(f)$$
$$= \text{gain sech}\left(\left(\frac{f}{f_0}\right)^p\right) - \text{loss sech}\left(\frac{f}{f_1}\right)$$
$$f = \sqrt{\left(\frac{u}{s_x}\right)^2 + \left(\frac{v}{s_y}\right)^2}$$

Eq. 11 in which "sech" is the hyperbolic secant function, "gain", "loss", $f_0$, $f_1$, and p are parameters. Typical values for these parameters are as follows:

$f_0$=4.173
$f_1$=1.362
loss=0.8493
gain=373.1
p=0.7786.

In some embodiments of the present invention, it is convenient to choose an oblique filter, OEF having the form given in Eq. 12.

$$OEF(u, v) = OEF(f, \theta)$$
$$= 1 - \left(1 - \text{Exp}\left(-\frac{f - \text{corner}}{\text{slope}}\right)\right)$$
$$\text{Sin}^2(2\theta) \text{ if } f > \text{corner}$$
$$= 1 \text{ if } f \leq \text{corner}$$
$$\theta = \text{ArcTan}\left(\frac{u}{s_x}, \frac{v}{s_y}\right)$$

Eq. 12 in which "corner" and "slope" are parameters. Typical values for "corner" and "slope" are corner=3.481 and slope=13.57149.

Following processing of both the test image and the reference image by CSF, 102, the resulting filtered images are subtracted pixel-by-pixel, 103. The result is the difference image D(x,y) of Eq. 13.

$$D(x,y) = F_{test}(x,y) - F_{reference}(x,y)$$

Eq. 13

In some embodiments of the present invention, it is advantageous to create a mask image, M(x,y), from the filtered reference image $F_{reference}(x,y)$. In such embodiments, the absolute value of the filtered reference image is raised to a power "a", convolved with a masking filter MF(x,y), added to the constant 1 and the b'th root of the resulting expression is computed as in Eq. 14.

$$M(x, y) = [1 + MF(x, y) \otimes |F_{reference}(x, y)|^a]^{\frac{1}{b}} \qquad \text{Eq. 14}$$

in which the convolution operator ⊗ indicates discrete convolution.

In some embodiments, it is advantageous to choose a=b=2 in Eq. 14, resulting in a mask image M(x,y) given by Eq. 15.

$$M(x,y) = \sqrt{1 + MF(x,y) \otimes F_{reference}^2(x,y)} \qquad \text{Eq. 15}$$

Furthermore, it is advantageous in some embodiments of the present invention to choose the masking filter MF(x,y) to have the form of Eq. 16

$$MF(x, y) = MF(r) = mgain \, \text{Exp}\left(-\pi \left(\frac{r}{mscale}\right)^2\right) \qquad \text{Eq. 16}$$

in which "mgain" and "mscale" are parameters. Typical choices for mgain and mscale are mgain=0.2 and mscale=0.1.

In some embodiments of the present invention, the difference image D(x,y) is divided by the masking image to yield a masked difference image MD(x,y) according to Eq. 17.

$$MD(x, y) = \frac{D(x, y)}{M(x, y)} \qquad \text{Eq. 17}$$

For those embodiments in which a mask image is not employed, the masked difference image is simply the difference image. Also, when a mask image is not employed, the subtract operation 103 can optionally precede the CSF 102.

At this "boost" stage, 106 in FIG. 1, the absolute value of the masked difference image is computed, raised to a power β, and convolved with a window function W(x,y). The result of these operations is a function that is then raised to the power 1/β and multiplied by the factor $(p_x p_y)^{1/\beta}$ to produce a Just Noticeable Difference Image JND(x,y) as in Eq. 18. A typical value for β is β=2.408

$$JND(x, y) = (p_x p_y)^{\frac{1}{\beta}} [W(x, y) \otimes |MD(x, y)|^\beta]^{\frac{1}{\beta}} \qquad \text{Eq. 18}$$

In some embodiments, it is advantageous to use a window function W(x,y) as given by Eq. 19

$$W(x, y) = W(r) = \text{Exp}\left(-\pi \left(\frac{r}{wscale}\right)^2\right) \qquad \text{Eq. 19}$$

in which "wscale" is a parameter, advantageously chosen to be approximately 1.013 in some embodiments.

It is advantageous in some embodiments of the present invention to display the complete JND(x,y) image, 107 in FIG. 1. While optional, such a display can provide a useful visual indication of the location and magnitude of visual signals. The JND(x,y) image can be "thresholded" (setting to zero values less than a threshold, T), reduced in size (or otherwise scaled), and/or converted to a portable format to provide a compact record of the information.

The next stage in the process combines or "pools" the values of JND(x,y) of the pixels in the x and y directions to produce a single value of JND. It is convenient to use a Minkowski summation to effect this pooling with a parameter ψ as exponent, as given in Eq. 20.

$$JND = (p_x p_y)^{\frac{1}{\psi}} \left(\sum_y^{n_y} \sum_x^{n_y} |JND(x, y)|^\psi\right)^{\frac{1}{\psi}} \qquad \text{Eq. 20}$$

The number, JND of Eq. 20 is the desired numerical value characterizing the Spatial Standard Observer.

In some embodiments, it is advantageous to let ψ→∞, in which case Eq. 20 reduces to Eq. 21.

$$JND = \text{Max}[JND(x,y)] \qquad \text{Eq. 21}$$

In some embodiments of the present invention, it is advantageous to apply a non-linear transformation (for example, a power function) to the JND computed from either Eq. 20 or Eq. 21. Thus, whether or not a non-linear transformation is applied to JND, and whether or not border effects are relevant for the particular image(s) under consideration, the Spatial Standard Observer, as characterized by the value of JND, provides an effective visibility metric, able to be computed relatively rapidly.

Figure 2:
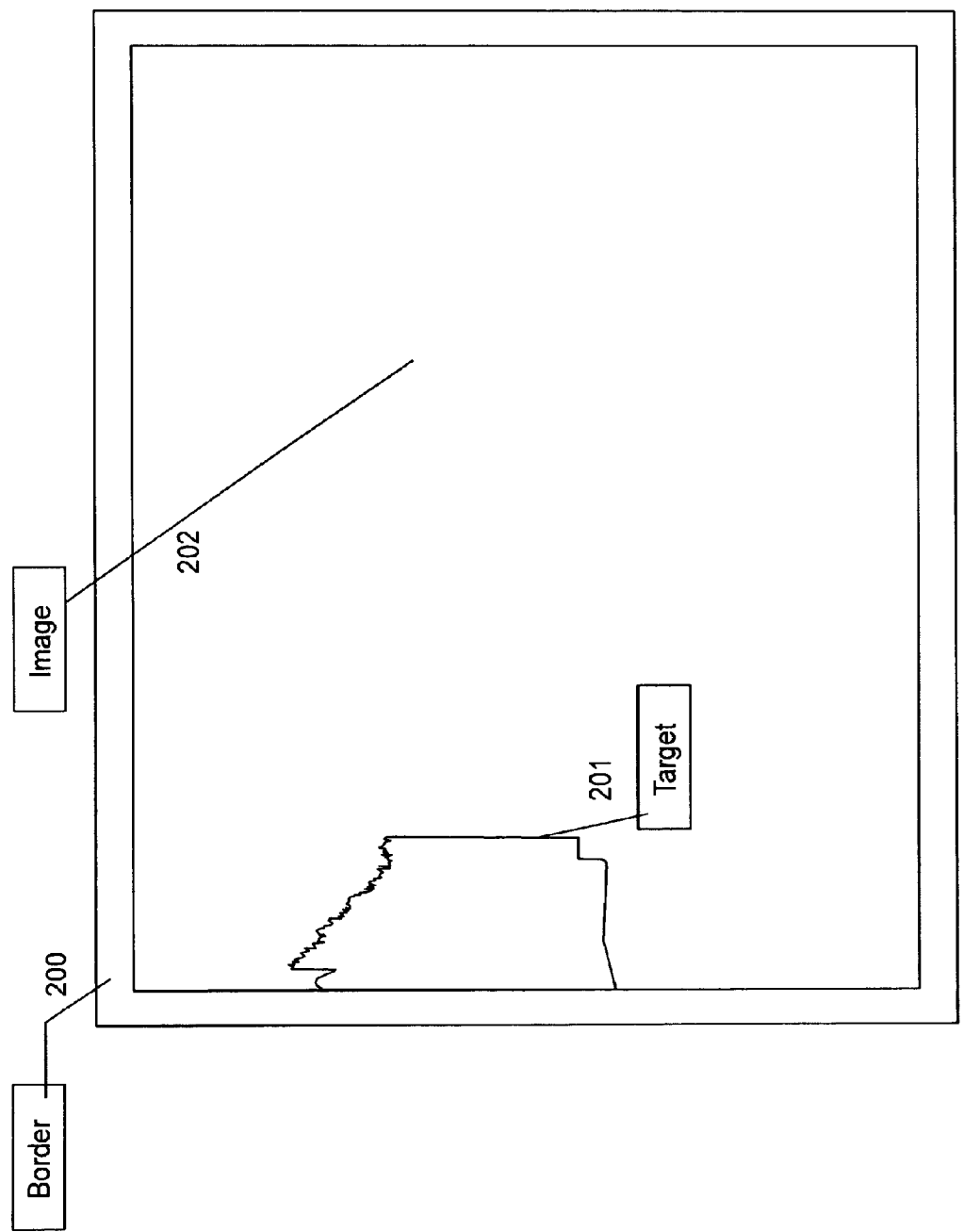
FIG. 2 depicts a typical target adjacent to a dark border surrounding the image.

In some applications, the target or test image (201 in FIG. 2) may be located adjacent to a border 200 of the image region 202, as depicted in FIG. 2. If the region of the display outside the image, 200, is darker than the display, 202, for example, the dark region of a Liquid Crystal Display (LCD) panel, then the visibility of the target 201 in the region will typically be reduced. An example of this situation is depicted in FIG. 2. Thus, it is advantageous in some embodiments of the present invention to use special techniques for the treatment of border areas in order to produce correct visibility estimates for such targets.

In some embodiments of the present invention it is advantageous to multiply the contrast images by a spatial border aperture function BA(x,y) between the Contrast and CSF steps, that is, at 120 in the process flow diagram of FIG. 1. The resulting Contrast Border Aperture Function, CBA(x,y) is thus $$CBA(x,y) = C(x,y)BA(x,y) \qquad \text{Eq. 22}$$

Then CBA(x,y) is used in place of C(x,y) at the CSF step, Eq. 9.

Figure 3:
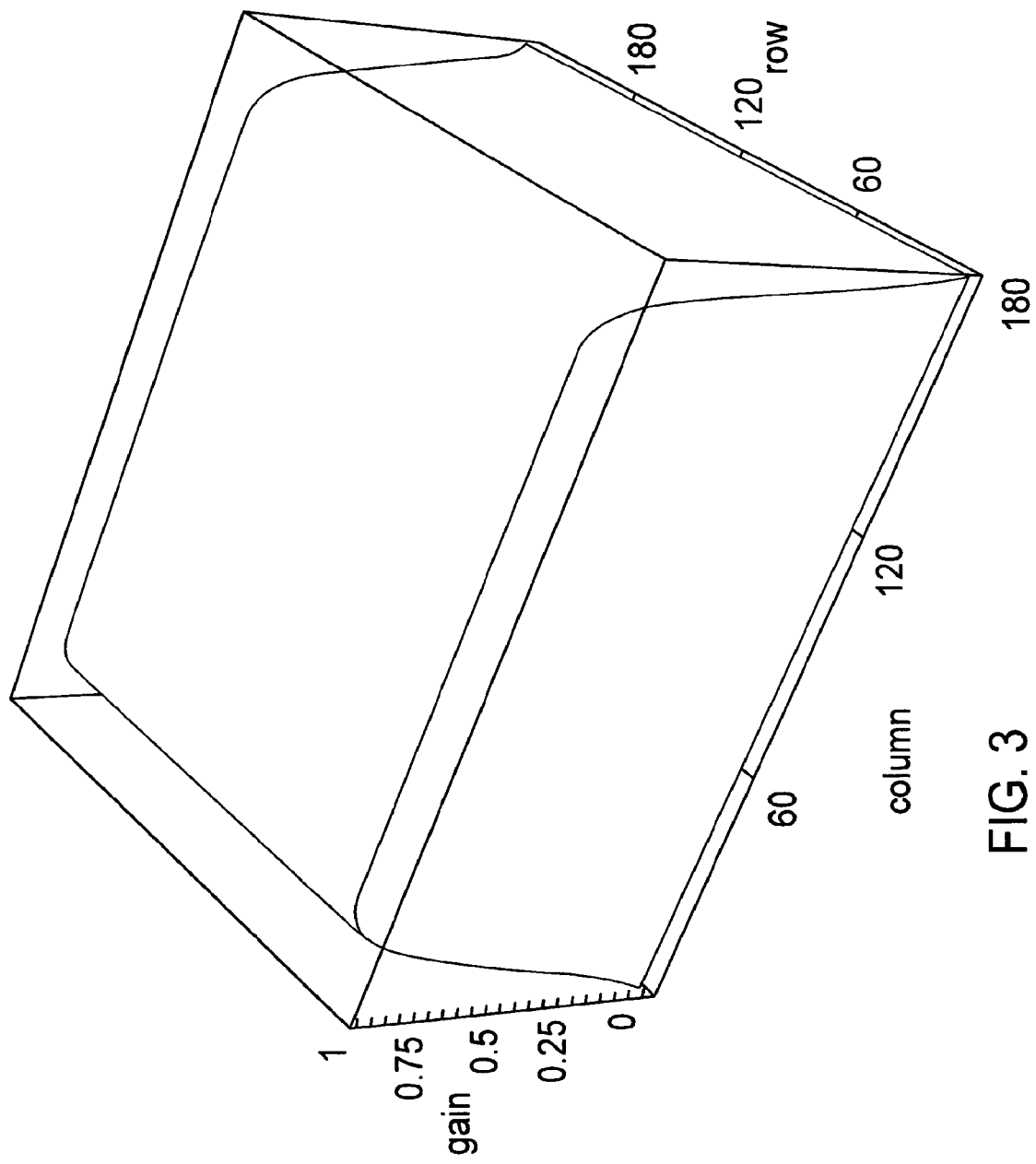
FIG. 3 depicts a typical border aperture function that, in this example, has 240 columns, 180 rows, each pixel is (1/60) degree in height and width. The value of the parameter bscale is 0.50 deg., and bgain is 1.

In some embodiments of the present invention, the border aperture function is advantageously chosen to be:

$$BA(x, y) = 1 - bgain \, \text{Exp}\left(-\pi \frac{\text{Min}\left[\begin{array}{c}(x-1)p_x, (y-1)p_y, \\ (n_x-x)p_x, (n_y-y)p_y\end{array}\right]^2}{bscale^2}\right) \qquad \text{Eq. 23}$$

in which "bgain" and "bscale" are parameters. An example of this function is given in FIG. 3 in which the image is taken to have 240 columns (x-coordinate) and 180 rows (y-coordinate). Each pixel in this example is taken to be (1/60) degree in both height and width. The parameters are chosen in this example as bscale=0.5 degree and bgain=1.

The use of a border aperture function, BA(x,y) as in Eq. 23, has the advantage of simplicity, but as an approximation, it may not be as accurate as alternative methods. In other embodiments, it is advantageous for the parameters bscale and bgain to depend upon the luminance contrast between the image and the border. Typically, a margin is added to the image such that the enlarged image, image+margin, contains a portion of the border. This enlarged image is then processed as the "image" pursuant to the image processing techniques described herein, typically including the masking component of the processing, 105. The presence of a portion of the border in the enlarged image will tend to produce the appropriate masking effect, tending to reduce visibility of targets or portions of targets near the border.

There are various ways the use of an enlarged image can be implemented to treat border effects. For example, it is convenient to take the width of the border region to be Round$[2*\text{mscale}/p_x]$ and the height to be Round$[2*\text{mscale}/p_y]$, in which mscale is the masking parameter (Eq. 16). "Round[]" is a function that generates as the value of the function that integer nearest to the value of the function's argument. The dimensions of the enlarged image are then given by Eq. 24 as:

$$\text{width} = n_x + \text{Round}[2*\text{mscale}/p_x]$$

$$\text{height} = n_y + \text{Round}[2*\text{mscale}/p_y] \qquad \text{Eq. 24}$$

An advantage of treating border effects with an enlarged image is that it more correctly deals with the dependence of the border masking effect upon the luminance contrast between the border and the (original, unenlarged) image. A possible disadvantage is that this approach requires somewhat more processing to include the masking step.

JND from Eq. 20 (or Eq. 21 for $\psi \to \infty$) relates to the percentage of human observers who will notice a difference. For example, images leading to JND having a value around 1 will typically present noticeable differences to about 75% of typical human observers. Images resulting in larger JND values will present noticeable difference to a correspondingly larger percentage of typical human observers, although the precise functional relationship between JND and the percentage of viewers observing differences may not be readily known.

It is advantageous in some embodiments of the present invention to use JND as a measure of different levels of perceptual intensity. That is, larger JND values indicate that a larger percentage of observers will notice a difference. But also larger values of JND typically indicate that a given observer will be more likely to observe more detailed differences. By way of illustration and not limitation, we consider the example of observing a scene through some form of optical instrument, such as a remote viewing device, night vision goggles, among others. A given observer may require an image value of $\text{JND}_1$ in order to conclude that some object is present other than natural background. However a value of $\text{JND}_2 > \text{JND}_1$ would be required for the observer to conclude that the object is a military vehicle. And a value of $\text{JND}_3 > \text{JND}_2$ would be required to conclude that it is a hostile military vehicle. Thus, JND values as determined by the SSO can be a useful measure of not only minimal levels of visibility but, when more stringently applied, also estimate the probable level of perceptual information obtainable from a given image.

Figure 4:
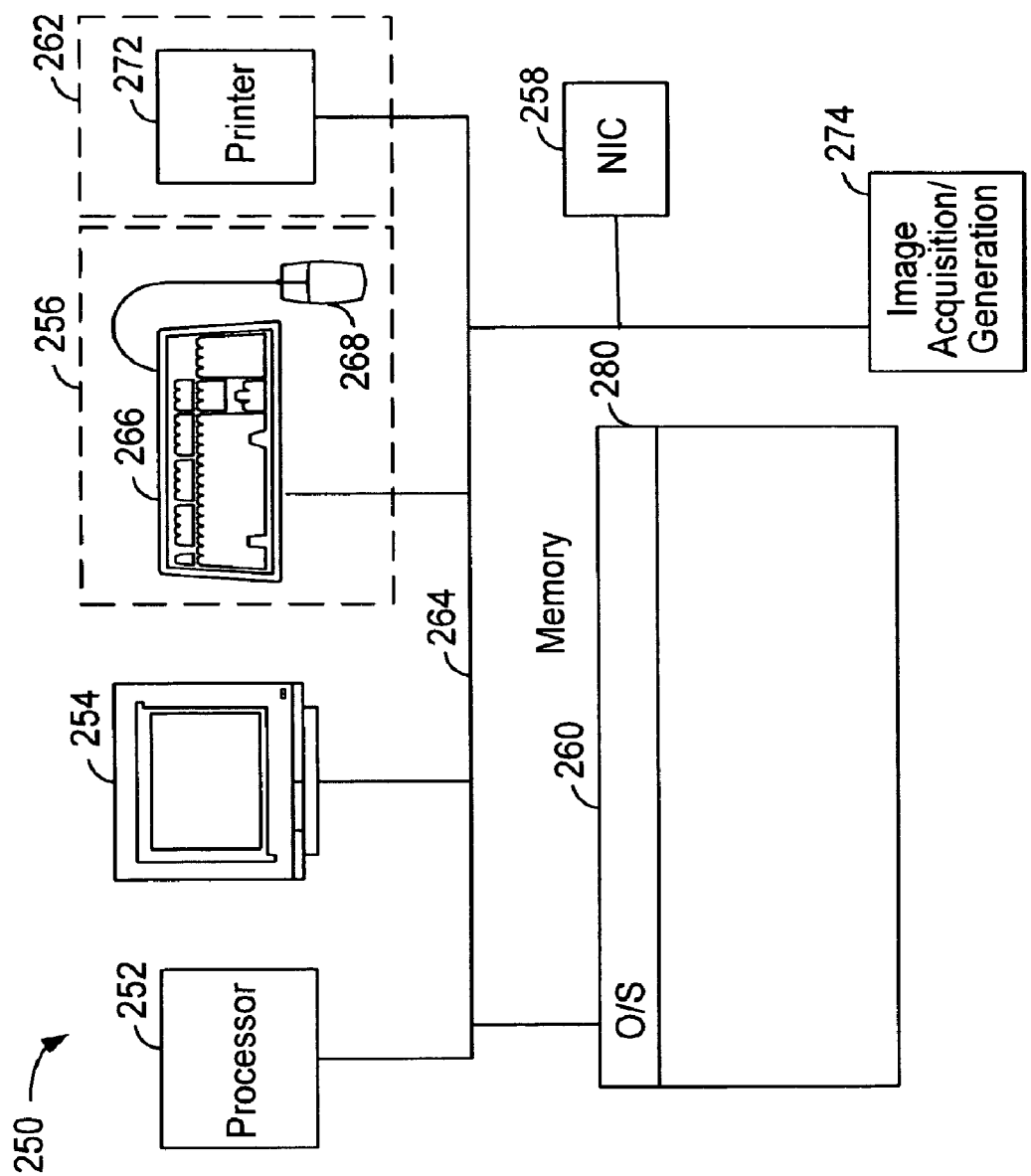
FIG. 4 depicts a high-level block diagram of an exemplary computer system that can be used for implementation of techniques of the Spatial Standard Observer.

FIG. 4 depicts an illustrative computer system 250 that utilizes the teachings of the present invention. The computer system 250 comprises a processor 252, a display 254, input interfaces 256, communications interface 258, memory 260, and output interfaces 262, all conventionally coupled by one or more busses 264. The input interfaces 256 comprise a keyboard 266, mouse, trackball or similar device 268, as well as mass-storage input devices such as CDs, DVDs, magnetic discs of various designs among others. The output interface 262 is a printer 272. The communications interface 258 is a network interface card (NIC) that allows the computer 250 to communicate via a network, such as the Internet. Image acquisition/generation devices 274 provide the images 100 for the generation of the SSO and are also coupled to the processor 252. The units 274 can supply either stored or realtime input data, or both.

The memory 260 typically comprises different modalities, illustratively semiconductor memory, such as random access memory (RAM), and disk drives. Depending on the embodiment, the memory 260 typically includes an operating system, 280. The operating system 280 may be implemented by any conventional operating system such as UNIX®, WINDOWS®, and LINUX®, among others.

Although various embodiments which incorporate the teachings of the present invention have been shown and described in detail herein, those skilled in the art can readily devise many other varied embodiments that still incorporate these teachings.

What is claimed is:

1. A method of reducing wrap-around in a digital image processing process that compares a digital test image and a digital reference image and that includes one or more convolution steps, the method comprising:
   a) producing a reference luminance image from the reference image and a test luminance image from the test image;
   b) producing a local mean luminance reference image as a convolution of the reference luminance image and a luminance filter function;
   c) producing a test contrast image that is at least one of the following: (c1) a mathematical combination of the test luminance image and the local mean luminance reference image and (c2) a mathematical combination of the test luminance image, the local mean luminance reference image and a border aperture function and (c3) a mathematical combination of the test luminance image, the local mean luminance reference image and an image of a border surrounding the reference image;
   d) producing a reference contrast image that is at least one of the following: (d1) a mathematical combination of the reference luminance image and the local mean luminance reference image and (d2) a mathematical combination of the reference luminance image, the local mean luminance reference image and the border aperture function;
   e) applying a contrast sensitivity filter to the test contrast image to produce a filtered test image;
   f) applying the contrast sensitivity filter to the reference contrast image to produce a filtered reference image;
   g) providing a difference image by at least one of the following two processes: (g1) subtracting the filtered reference image from the filtered test image to produce a difference image, and (g2) producing a mask image as a mathematical combination of the filtered reference image with a masking filter, and producing a difference image as a ratio of the difference image and the mask image;
   h) producing a just noticeable difference image as a mathematical combination of the difference image with a window function; and
   i) pooling the just noticeable difference image to produce a visibility metric, wherein the convolution operation in at least one of process (b) and process (h) is performed using a confined convolution process that comprises:
  (i-1) receiving an image I(x,y), expressed as an array of $k_{xo}$-by-$k_{yo}$ pixels in an x-direction and in a y-direction, respectively, where $k_{xo}$ and $k_{yo}$ are selected positive integers;
  (i-2) padding the image I(x,y) with $k_x$ zeroes in the x-direction and by $k_y$ zeroes in the y-direction, to provide a first intermediate image I1(x,y), expressed as an array of $(k_{xo}+k_x)$-by-$(k_{yo}+k_y)$ pixels in the x-direction and in the y-direction, respectively, where $k_x$ and $k_y$ are selected non-negative integers;
  (i-3) convolving the first intermediate image I1(x,y) with a selected non-negative kernel function K(x,y), expressed as an array of $k_x$-by-$k_y$ pixels in the x-direction and in the y-direction, respectively;, to obtain a second intermediate image I2(x,y) expressed as an array of $(k_{xo}+k_x)$-by-$(k^{yo}+k_y)$ pixels in the x-direction and in the y-direction, respectively; and
  (i-4) cropping the second intermediate image I2(x,y) to an array of $k_{xo}$-by-$k_{yo}$ pixels in the x-direction and in the y-direction, respectively, to obtain a third intermediate image I3(x,y), expressed as an array of $k_{xo}$-by-$k_{yo}$ pixels in the x-direction and in the y-direction, respectively.

2. The method of claim 1, further comprising preprocessing at least one of said test image and said reference image by downsampling.

3. The method of claim 1, further comprising preprocessing at least one of said test image and said reference image by convolution with a selected pre-filtering function.

4. The method of claim 1, further comprising preprocessing, by cropping, at least one of said test image and said reference image.

5. A method of forming a digital reference image from a digital test image, the method comprising:
  a) providing a test image having first and second opposing sides of the image
  b) performing a confined convolution of the test image with a selected filter that isolates the first and second opposing sides of the image from each other, to thereby form the digital reference image, wherein the confined convolution process comprises an ordered sequence of operations, denoted PCC, on an image, the sequence comprising:
  (i-1) receiving an image I(x,y), expressed as an array of $k_{xo}$-by-$k_{yo}$ pixels in an x-direction and in a y-direction, respectively, where $k_{xo}$ and $k_{yo}$ are selected positive integers;
  (i-2) padding the image I(x,y) with $k_x$ zeroes in the x-direction and by $k_y$ zeroes in the y-direction, to provide a first intermediate image I1(x,y), expressed as an array of $(k_{xo}+k_x)$-by-$(k_{yo}+k_y)$ pixels in the x-direction and in the y-direction, respectively, where $k_x$ and $k_y$ are selected non-negative integers;
  (i-3) convolving the first intermediate image I1(x,y) with a selected non-negative kernel function K(x,y), expressed as an array of $k_x$-by-$k_y$ pixels in the x-direction and in the y-direction, respectively:, to obtain a second intermediate image I2(x,y) expressed as an array of $(k_{xo}+k_x)$-by-$(k_{yo}+k_y)$ pixels in the x-direction and in the y-direction, respectively; and
  (i-4) cropping the second intermediate image I2(x,y) to an array of $k_{xo}$-by-$k_{yo}$ pixels in the x-direction and in the y-direction, respectively, to obtain a third intermediate image I3(x,y)=PCC $\{K(x,y), I(x,y)\}$, expressed as an array of $k_{xo}$-by-$k_{yo}$ pixels in the x-direction and in the y-direction, respectively.

6. The method of claim 1, further comprising receiving said third intermediate image, I3(x,y)=PCC$\{K(x,y), I(x,y)\}$ and forming a fourth intermediate image, defined as $$I4(x,y)=K(x,y)\copyright I(x,y)$$

$$=PCC\{K(x,y), I(x,y)\}/PCC\{K(x,y)/\Sigma_x\Sigma_y K(x',y'), I(x,y)\}.$$

7. The method of claim 5, further comprising receiving said third intermediate image, I3(x,y)=PCC$\{K(x,y), I(x,y)\}$ and forming a fourth intermediate image, defined as $$I4(x,y)=K(x,y)\copyright I(x,y)$$

$$=PCC\{K(x,y), I(x,y)\}/PCC\{K(x,y)/\Sigma_x\Sigma_y K(x',y'), I(x,y).$$

* * * * *